Nov. 23, 1926.
J. W. PATTERSON
1,607,964
ART OF MANUFACTURING VULCANIZED RUBBER ARTICLES
Original Filed Nov. 18, 1922     3 Sheets-Sheet 1
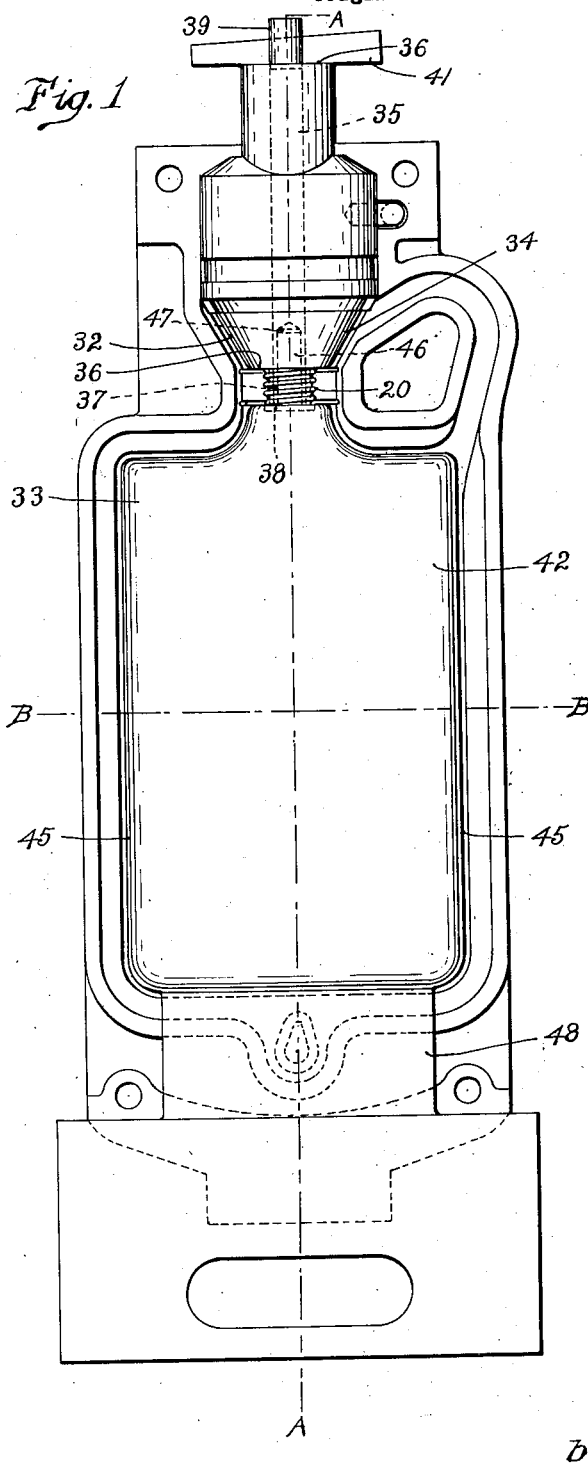
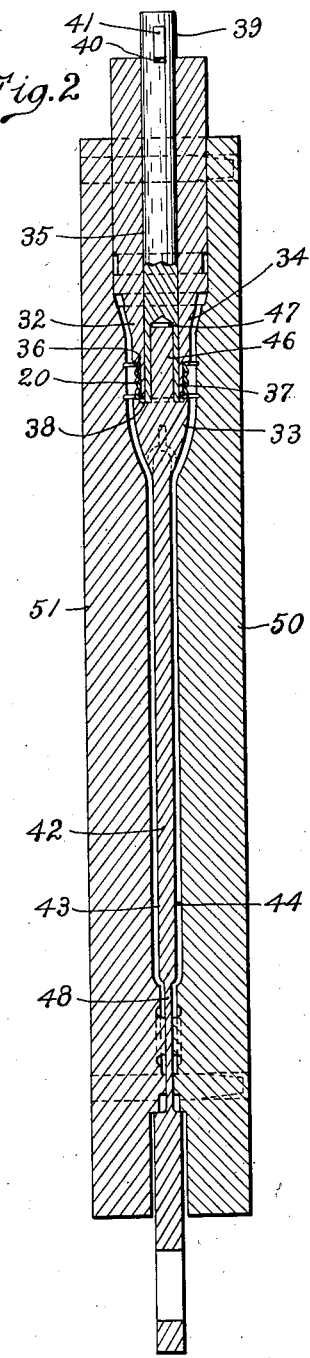
Inventor:
John W. Patterson
by Jesse A. Holton
Atty.

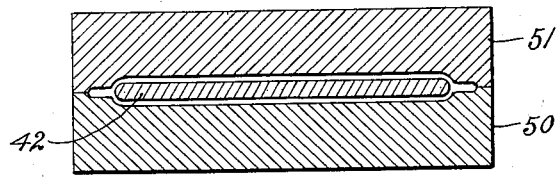
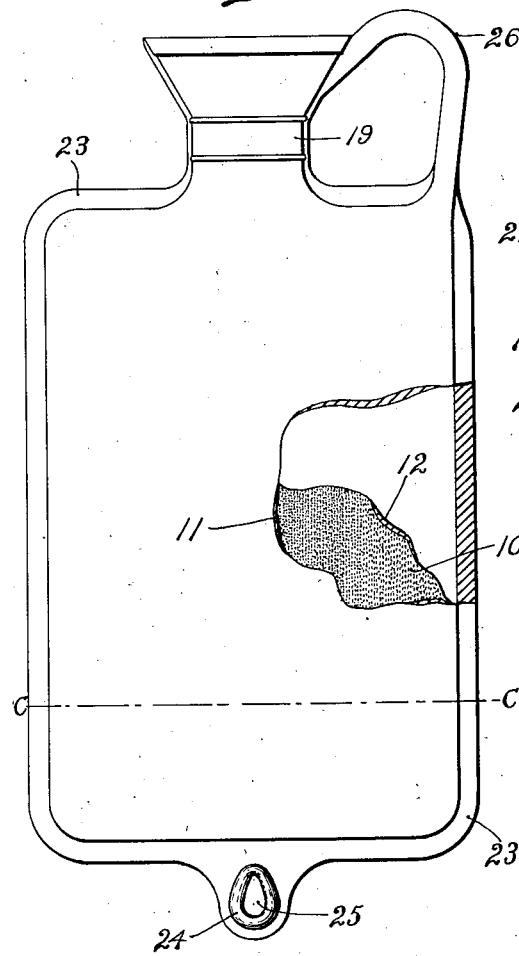
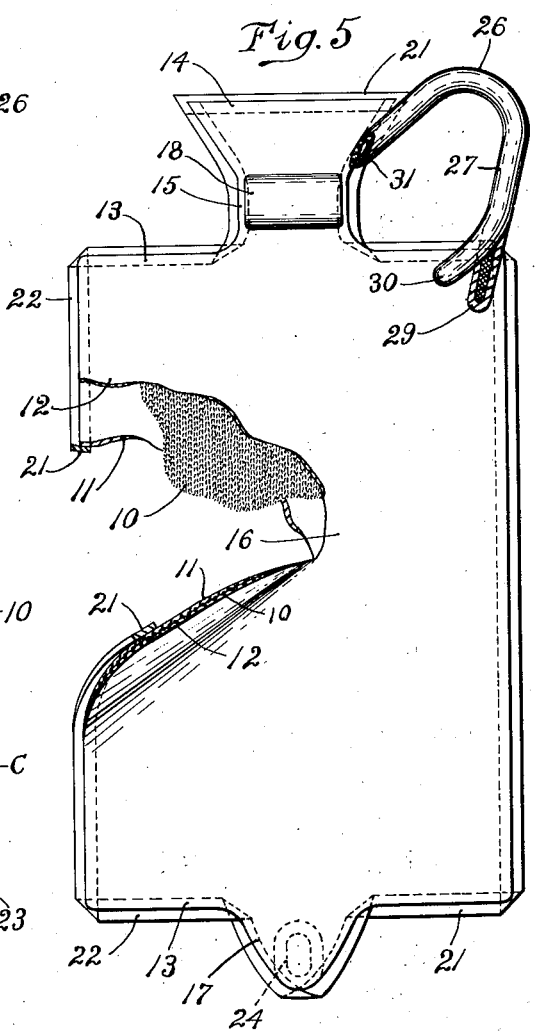

Nov. 23, 1926.  
J. W. PATTERSON  
1,607,964  
ART OF MANUFACTURING VULCANIZED RUBBER ARTICLES  
Original Filed Nov. 18, 1922    3 Sheets-Sheet 3
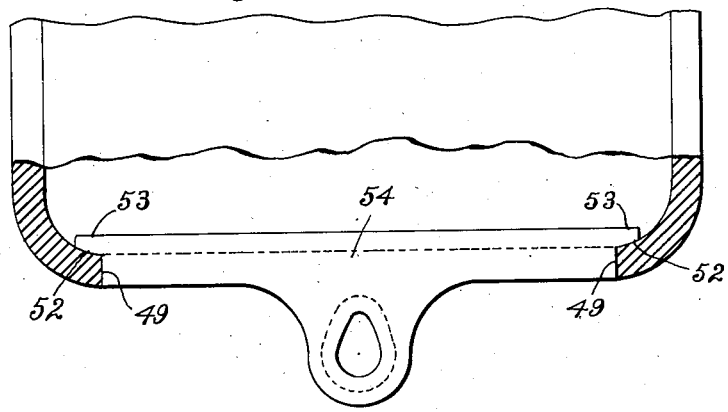
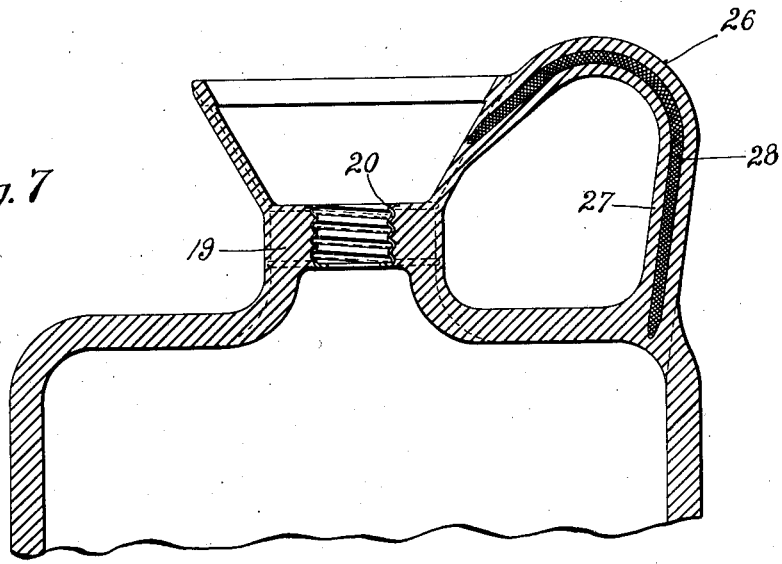
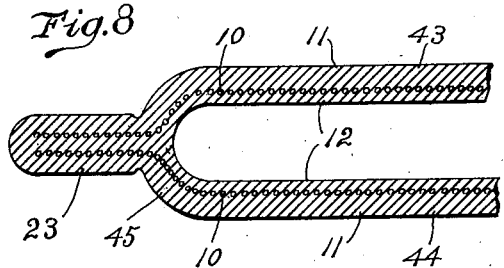
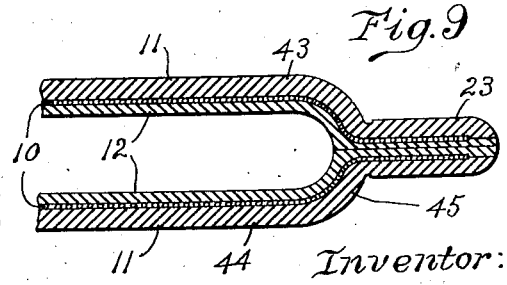
Inventor:  
John W. Patterson  
by Jesse A. Holton  
Atty.

Patented Nov. 23, 1926.

1,607,964

UNITED STATES PATENT OFFICE.

JOHN W. PATTERSON, OF NEW HAVEN, CONNECTICUT, ASSIGNOR TO THE SEAMLESS RUBBER COMPANY, INC., OF NEW HAVEN, CONNECTICUT, A CORPORATION OF MASSACHUSETTS.

ART OF MANUFACTURING VULCANIZED RUBBER ARTICLES.

Application filed November 18, 1922, Serial No. 601,914. Renewed August 6, 1926.

This invention relates to the art of manufacturing vulcanized fabric reinforced hollow rubber articles such as hot water bottles.

It is particularly desirable that rubber water bottles, or the like, possess the following properties or characteristics, viz, great strength, smooth uniform surface, leak-proof jointures between the parts, light weight, high flexibility, long life, and considerable elasticity. In an effort to produce bottles having such combination of properties, bottles have been manufactured with walls comprising an intermediate ply of square woven straight cut fabric, thinly coated on both surfaces with rubber. None of the bottles produced by the methods heretofore known, however, have possessed all of the desirable properties referred to, and such of said properties or characteristics as they have possessed are not present in the most satisfactory degree.

One method of manufacturing fabric reinforced water bottles heretofore practiced is known as the "hand method" and comprises the following steps: First a sheet of square-woven fabric of close tight mesh is given a thin coat of rubber on both of its surfaces, each of the respective coatings being of substantially the same thickness. From the sheet so prepared, blanks adapted to form the body of the bottle are then cut or died out. These blanks are of such size and form that when two of them are secured together in opposed relation they will constitute the body portion of the bottle. Preparatory to joining two of the blanks together a coating of soapstone is applied to the inner surface of one or both of the blanks for the purpose of preventing the opposed faces of the pair of blanks from sticking or uniting together during the steps of building the bottle and vulcanizing it. The coating of soapstone does not extend entirely to the edges of the blanks, a narrow margin of adhesive rubber being left at the outer periphery of the blanks to enable them to be joined together by a suitable sealing strip. This sealing strip consists of a narrow piece of vulcanized rubber folded longitudinally along a central line to make it substantially V-shaped in cross-section. The strip is applied by hand to the adhesive margins of the inner faces of the blanks and serves to join the companion pair of blanks together in opposed relation. A binder strip of unvulcanized rubber is then applied by hand around the edges of the joined blanks. This strip is folded so as to overlap the margin of the outer face of each of the blanks and is pressed by the operator into adhesive engagement with said margins. The neck and mouth of the bottle are then built up by hand from friction coated, square woven fabric and applied by hand to the body of the bottle. The handle is next applied by hand, one of its ends being adhesively secured to the body of the bottle and the other end being adhesively attached to the neck and mouth thereof. The bottle so made is then completed by suitable "open" vulcanization.

It is to be noted that in carrying out the described method no core or molds are employed and consequently that the strength and efficiency of the joints between the various parts will depend entirely upon the adhesive qualities of the rubber and the skill of the operator in joining the elements. This constitutes a serious objection, as frequently spots of insufficient or no union occur at the numerous joints, with the result that the bottle is rendered useless, or soon breaks down under the pressure and flexing encountered in service.

Another objection to the method is the high labor costs involved by reason of the large number of manual operations necessary to produce the bottle, and by reason of the further fact that many months of training are required to give operatives the requisite skill to produce bottles in such quantities as to make their services commercially profitable.

The method is further objectionable in that many of the bottles produced thereby are characterized by puckers, or wrinkles in the binding and sealing strips at the points where such strips are bent to form the jointures at the corners of the bottles. These puckers, or wrinkles, provide channels through which water and moisture is conducted into contact with the fabric exposed at the edges of the blanks. The fabric by reason of its hygroscopic properties readily absorbs such water and moisture, with the result that rotting of the fabric and peeling away of the rubber surfaces thereon soon occurs, rendering the bottle worthless.

The method is further objectionable in that only very thin layers of fabric and rubber may be used in the blanks as it is necessary that the blanks be sufficiently yielding and pliable to adapt them to be freely flexed and manipulated by the operator into the desired conformation and union with the other parts. If thick coatings of rubber were used, the blanks would tend to pull away from adhesive union with the sealing and binding strips and other parts during the process of manufacture, and especially during the vulcanizing step when the rubber softens. Furthermore, the outer layer of rubber which is of necessity made thin does not have sufficient body to efficiently withstand the flexing, stretching and wear to which it is subjected in service or to resist the ageing effects of the freely circulating currents of air to which it is exposed, and as a result the said layer soon oxidizes, hardens, cracks, and peels away from the fabric, thus destroying the utility of the bottle. The breakdown of the bottle is hastened by water and moisture entering the fabric through cracks in the rubber or through the spots where the rubber has worn away or peeled off. As it is desirable that the fabric be thin and yet possess great strength, only straight cut, square woven fabric of close tight weave has been employed. Such fabric cannot be thoroughly impregnated by the rubber coatings and consequently the union between the rubber layers and the fabric is so weak that peeling of the rubber layers from the fabric quickly occurs under the flexing and stretching incident to service. Thorough tests show that the layers of rubber merely unite to the external surfaces of the sheet of fabric and do not penetrate entirely through the fabric. Both of the layers are, therefore, distinctly separated from each other by the sheet of fabric. The tests further show that the union between the rubber layers and the fabric is so weak that the rubber may be readily peeled away from the fabric by the fingers. Due to the fact that the fabric is not penetrated or thoroughly impregnated with the rubber of the layers, it remains in a highly absorbent condition and thus will readily absorb and distribute any water or moisture that may leak into contact with it through cracks or openings in the rubber or through the wrinkles at the joints. The use of square woven straight cut tightly packed fabric produces puckers at the margins of the blanks where the blanks are shaped over the sealing strip and such puckers provide additional channels through which water may come in contact with the fabric exposed at the edges of the blanks.

The method is further objectionable in that the bottle produced thereby is characterized by a rough, uneven surface and unsymmetrical outline which give the bottle an unsightly appearance and detract greatly from its salability. The outer layer of rubber of the blanks is of necessity made so thin that the outlines of the threads of the fabric are plainly visible therethrough in the finished bottle. The numerous irregularities and humps present on the surface of the bottle make the bottle objectionable for application to parts of the body that have been rendered highly sensitive by injury or disease.

Another method which has been heretofore practiced in the manufacture of fabric reinforced water bottles is as follows: A thick stiff sheet of square woven straight cut, duck of close tight weave is first friction coated on both of its surfaces with a thin layer of rubber, the layers of rubber on the respective surfaces being made of substantially the same thickness. From the material so prepared are cut or died, blanks of such shape that a pair of the blanks when opposed and joined together around their margins will constitute the body, neck, mouth, and handle of the bottle. One of the blanks so formed is laid in one section of a suitable mold and a thin flat flexible sheet of paper cut to a pattern to define the inner walls of the body, neck and mouth of the bottle, is superposed thereon. A companion blank is then laid over the assembled blank and paper sheet, after which the other half of the mold is brought down and locked in place. The paper sheet serves to prevent the opposed faces of the blanks from sticking together during vulcanization. It is made of less area than the blanks, so that an adhesive margin is provided around the periphery of each of the opposed surfaces of the pair of blanks. These adhesive margins enable the blanks to be united together during the vulcanizing step. When a pair of the blanks has been suitably vulcanized together at their margins to constitute the bottle, the thin paper sheet is withdrawn through the opening in the mouth of the bottle and a rubber core containing a metal threaded thimble is cemented in place in the neck of the bottle. Suitable circular openings are then cut through the upper corners of the bottle to provide handholds by which the bottle may be lifted or suspended.

This method of manufacture is objectionable in that the walls of the bottle produced thereby are stiff and unyielding and have a relatively hard surface, which characteristics make the bottom undesirable for application to parts of the body rendered particularly sensitive by disease or injury. These undesirable characteristics result from the use of a stiff, closely woven sheet of duck to reinforce the walls, and further because of the very thin surface layers of rubber used on the fabric reinforcement.

The method is further objectionable in that the bottle produced thereby has an outer layer of rubber too thin to efficiently withstand the ageing effects of freely circulating currents of air, and the stretching, frictional wear, and flexing, to which it is subjected in service. The thin outer layer soon oxidezes and hardens from contact with air, with the result that when the bottle is flexed, cracks develop through which water and moisture leak into contact with the fabric, producing disintegration of the fabric and peeling away of the rubber layers.

Another objectionable feature of the method is that the bottle produced thereby has its fabric layers exposed throughout the entire edges of the bottle. Water and moisture readily enter the fabric at such edges, producing rotting of the fabric and peeling away of the rubber layers.

A further objection to the method is that the bottle produced thereby is so weak that its life in service is comparatively short. This weakness of the bottle is due to the fact that the rubber layers do not thoroughly penetrate the stiff, closely woven duck reinforcing sheets but exist merely as distince independent surface layers thereon. The union of the rubber layers with the duck is not sufficiently strong to prevent separation of the layers under the flexing and stretching incident to service, or to enable a strong permanent leakproof bond to be made between the united margins of the blanks.

Another objection to the method is that it produces a flat, thin bottle, which when filled with water will have its front and rear walls sharply curved or bellied from the margins of the bottle toward the center. Thus the filled bottle will not have a broad flat face adapted to rest comfortably and with uniform pressure throughout on the the part of the body to which it is applied. Furthermore, the bottle because of its undesirable shape when filled will tend to rock on or slide off the part of the body to which it is applied, and it will have a prominent central contact point from which the rubber will soon be worn off by friction.

Another objection to the method is that the bottle produced thereby will develop puckers or scallops along its margins when filled with water. Such deformations of the bottle result in the pulling apart of the joints at the margins of the blanks, thus causing leaks. The puckering and scalloping is due in part to the shape of the bottle and in part to the fact that a strong reinforcing rib is not provided at the margins. It is to be noted that the paper sheet used to prevent the inner faces of the blanks form sticking together does not serve to space the front and rear walls of the bottle an appreciable distance apart so as to provide in the finished bottle a long, wide relatively deep cavity for the reception of water. No edge walls for spacing the front and rear walls are formed in the bottle, as the paper sheet is too thin to produce such walls. It will be obvious from the foregoing that when the flat duck reinforced bottle is filled with water its walls will be greatly distorted to provide a cavity of sufficient size to hold the requisite quantity of water. This distortion draws the margins of the bottle inwardly, forming the undesirable puckers and scallops. Experience in the manufacture of bottles not reinforced with fabric has shown that the most desirable way of overcoming this difficulty is to form the bottle with its front and rear walls spaced apart a considerable distance by edge walls. Such a bottle will have a cavity normally capable of holding a large amount of water without undesirable distortion of its walls. Such bottles, when produced by the molding process, are usually made on a core of appreciable thickness, the core being withdrawn after vulcanization through a slit formed in the walls of the bottle for that purpose. Obviously the square woven, straight cut, duck reinforcing sheets heretofore used in the manufacture of the thin flat duck reinforced bottle can not be shaped over a core of appreciable thickness or turned over at the margins to form edge walls and marginal extensions for jointure, as such material cannot be shaped to the desired conformation without producing undesirable wrinkles and puckers. Furthermore, it is to be noted that in the thin flat bottles produced with the paper separating sheet, a strong elastic reinforcing rib is not provided at the edges of the bottle. On the contrary the joint at the margins is relatively stiff and unelastic; as only very thin layers of rubber are present therein, the major component of the margins being stiff duck. When such margins are pulled in and puckered under the distortion produced by filling the bottle, such puckers become permanently set in the margins.

Another objection to the method is that the bottle produced thereby is characterized by the outline of the threads of the duck reinforcing layer being plainly visible through the rubber outer layer. This feature is particularly undesirable as it makes the bottle unsightly and seriously detracts from its salability.

An object of the present invention accordingly is to provide improvements in the art of manufacturing rubber water bottles and the like, whereby the various disadvantages noted in the methods heretofore practiced are overcome, permitting the rapid and economical production of a superior article.

Another object of the present invention is to provide improvements in the art of manufacturing rubber water bottles and the like, whereby fabric reinforced, molded water bottles, possessing great strength and durability, attractive appearance, integral leak-proof joints, desirable form, soft yielding elastic surface finish, and high flexibility and elasticity, may be easily and rapidly manufactured at a minimum cost for labor.

For convenience and to facilitate a clear understanding of the advantages to be gained, this invention will be described and illustrated in connection with the production of hot water bottles from which description its particular scope and application will at once be apparent.

With the above and other objects in view, which will readily appear as the nature of the invention is better understood from this disclosure, the same consists in the novel steps, combination, and arrangement hereinafter more fully described, illustrated, and claimed.

Referring to the accompanying drawings:—

Figure 1 is a plan view of one of the female mold sections with the sectional core assembled therewith.

Figure 2 is a longitudinal section of the complete molding device taken on the line A—A of Figure 1.

Figure 3 is a transverse section of the complete molding device taken on the line B—B of Figure 1.

Figure 4 is a view of a completed bottle, portions being broken away to illustrate certain of the novel features of the construction.

Figure 5 is a plan view of one of the unvulcanized blanks, portions being broken away and laid back to show certain details of the construction.

Figure 6 is a fragmentary view of the bottom of the bottle, showing the rubber insert for sealing the slit in the bottom of the bottle, through which the core is withdrawn.

Figure 7 is a view of the upper part of the bottle split centrally flatwise to show the integral flange of rubber and the metal thimble associated with the walls of the bottle during the molding and vulcanizing operation.

Figure 8 is an enlarged fragmentary cross sectional view of the finished bottle on the line C—C of Figure 4.

Figure 9 is a view similar to Figure 8, the bottle being shown in its unvulcanized condition.

In carrying out the present invention in one of the preferred ways a sheet of stockinette 10 is run through a calender whereby the rubber layers 11 and 12 are applied to its surfaces. The rubber layer 11, which will constitute the outer surface of the finished bottle is preferably made of greater thickness than the layer 12 which will constitute the inner surface, as it is desirable that the outer layer have sufficient body to withstand frictional wear, stretching, flexing and hard usage and to efficiently resist the ageing action of freely circulating currents of air to which it is subjected in service. Preferably both rubber layers are made of sufficient thickness to provide enough rubber stock to thoroughly penetrate and impregnate the sheet of stockinette during the molding and vulcanizing of the bottle and to insure ample rubber on both the surfaces of the stockinette to completely conceal the same, and give the finished bottle a smooth, uniform, elastic and attractive exterior.

From the sheet of multiply material so prepared, are cut or died blanks 13, each blank being of a suitable pattern to constitute one-half of a bottle, and comprising a mouth portion 14, neck portion 15, body portion 16, and tab portion 17. (See Figure 5.) A pair of these blanks, when joined together around the margins will form the walls of the bottle.

Preparatory to placing a pair of the blanks in the vulcanizing molds, there is applied to the surface 12 of the neck portion 15 of each blank an oblong-shaped block 18 of unvulcanized rubber. The pair of blocks 18 are softened during the vulcanizing step and molded integrally together to form an eliptical flange 19 in the neck of the bottle, in which the metal thimble 20 for the bottle stopper is imbedded. (See Figure 7.)

There is also applied around the outer peripheral margin of each of the blanks a sealing and reinforcing strip 21 of unvulcanized rubber. These strips overlap the margins of the surface 11 of the blanks and extend outwardly beyond such margins. The outwardly extending portions 22 of the strips are united together during the vulcanizing step to form a thick covering of rubber over the edges of the blanks, thus effectively sealing such edges against the entrance of moisture and water into the fabric. It is to be noted at this point that the rubber of the strips enters into homogeneous union with the rubber of the layers 11 and 12 during the vulcanizing step to form in conjunction with the joined margins a strong elastic rib 23 extending outwardly from the edge walls of the bottle and centrally thereof. (See Figure 4.) This rib assists in maintaining the bottle in symmetrical shape when filled. The sealing strips further serve to provide ample rubber stock to insure a strong, integral bond between the blanks at their joined margins.

A grommet ring 24 of unvulcanized rubber is next applied to the surface 11 of the tab of each of the blanks. These rings form in the completed bottle a grommet around the opening 25 provided for suspension of the bottle.

A handle 26 for the bottle is next prepared. This consists of a tube 27 of unvulcanized rubber reinforced centrally by a core 28 of rolled friction coated fabric. One end of the handle is split centrally to provide two arms 29 and 30, one of the arms being adapted for union with one of the blanks and the other for union with the other blank. The other end 31 of the handle is formed substantially wedge-shaped for union with the mouth of the bottle. The handle is set in place by adhesively attaching one of its arms 29 to the body portion of one of the blanks and adhesively securing its end 31 to the mouth portion of the blank. (See Figures 5 and 7.)

When the various parts have been prepared as set forth, one of the blanks is placed in the cavity of one of the female mold sections. A sectional core is then superposed on the blank. This core comprises two main elements 32 and 33. (See Figures 1, 2 and 3.)

The element 32 comprises a flaring sleeve 34 adapted to form the interior of the mouth and neck of the bottle. This sleeve is provided with a longitudinal central bore 35 and is formed at one end with a shoulder 36 and a reduced cylindrical extension 37. The extension 37 is adapted to receive a metal thimble 20, such thimble being adapted to be embedded in the neck flange 19 of the bottle during the vulcanizing process. The thimble is retained in place on the reduced extension 37 by the shoulder 36 of the sleeve and the flange 38 formed on one end of a rod 39 detachably fitted in the bore 35 of the sleeve. The upper end of the rod 39 extends beyond the top of the sleeve and is provided with a slot 40 through which a wedge pin 41 is driven to draw the rod upwardly to clamp the thimble between the flange 38 and the shoulder 36.

The other element 33 of the sectional core comprises a wide, flat relatively thick rigid body member 42, adapted to support the inner faces of the walls of the body portion of the bottle during vulcanization. It is to be noted at this point that the shape of the core is such as to form a bottle having a front wall 43 a rear wall 44 and an edge wall 45. The edge wall serves to space the front and rear walls a sufficient distance apart to provide a cavity in the bottle of ample size to hold a large quantity of water without producing undesirable distortion of the walls of the bottle.

The upper end of the element 33 is formed with a pin 46 adapted to enter a recess 47 in the rod 39 of the core element 32 to secure the two core elements or sections together so that each element will be capable of adjustment in the mold independent of the other.

The lower end of the core element 33 is formed with a tongue 48 adapted to protrude through the base of the bottle to serve to maintain the edges of the blanks through a portion of the base of the bottle separated during the vulcanization of the bottle in order to provide an opening 49 for the final withdrawal of the core element therethrough. (See Figure 6.) It is not essential that the opening or slit be made in the bottom of the bottle as it may be satisfactorily formed at any other suitable place. It is further not essential that the core be provided with means for forming a slit as the slit may be cut in the bottle after the bottle is formed.

After the core sections have been assembled as set forth, the core is superposed on the blank within the mold section 50 and a companion blank is then applied. The mold section 51 is then brought down after which the bottle is subjected to suitable vulcanization. During vulcanization the rubber composing the layers 11 and 12 will soften sufficiently to thoroughly penetrate and impregnate the sheet of stockinette 10, and to pass under the pressure of the molds completely through the interstices existing between the strands of the stockinette, so that the two layers of rubber will be homogeneously united at a great number of closely spaced points throughout the entire walls of the bottle. The layers of rubber and fabric will thus be united into a permanent integral sheet or wall. (See Figures 8 and 9.) Tests have shown that the final union between the rubber layers and fabric is so strong that it is impossible to separate or peel the rubber from the fabric. This feature presents important advantages as it gives to the walls of the bottle such strength that stretching or flexing thereof will not produce cracks in the rubber or peeling, or separation of the rubber from the fabric reinforcement. It is to be noted that in the fabric reinforced water bottles heretofore known the layers of fabric and rubber exist in the final article as distinct, independent layers, the rubber layers being merely united to the surfaces of the sheet of fabric. Such weak construction permits the layers to peel or split away from the fabric when the walls of the bottle are stretched or flexed in service.

When the bottle has been built up as set forth, it is suitably vulcanized in the molding device, after which the molds are opened and the bottle with the sectional core in place therein is removed.

The core element 33 of the sectional core is next withdrawn through the slit 49 formed at the base of the bottle by the tongue 48. As has been previously pointed out, the core element 33 is made of sufficient thickness to space the front and rear walls of the completed bottle a considerable distance apart to provide a body cavity in the bottle of a size and shape adapted to contain a large quantity of water without objectionble distortion of the bottle, and to provide a bottle which when filled with the proper quantity of water will afford a broad, flat surface for contact with the body of the user. (See Figures 3 and 8.) It is desirable from the standpoint of facility in manufacture and ultimate efficiency of the bottle that the slit 49 provided for the redrawal of the core be made as short as possible. It is especially desirable that the unslit portions 52 be left at the base of the bottle between the sides of the bottle and the ends of the slit so that a strong, permanent vulcanized joint may be formed between the ears 53 of the sealing piece 54 used for closing the slit. (See Figure 6.) From the foregoing it will be apparent that in order that the wide relatively thick core element 33 may be withdrawn through the relatively narrow slit, the lips of the slit and the material adjacent thereto must be capable of a great amount of stretch to enable the slit to be temporarily enlarged sufficiently to permit withdrawal of the core element.

After the core element 33 has been withdrawn through the slit, the sealing piece of unvulcanized rubber 54 is placed between the lips of the slit. Its ears 53 overlap the unslit portions 52 at the base of the bottle. Suitable molding devices are then employed to engage the parts at the base of the bottle and hold them under proper pressure during the process of vulcanizing the lips of the slit permanently together.

The method set forth enables the rapid production at a relatively low cost for labor, of a water bottle possessing the following desirable properties or characteristics, viz: great strength, strong integral leak-proof joints, relatively light weight in proportion to strength, suitable form for containing a large amount of water without undesirable distortion, great elasticity, unusual durability, and an attractive smooth elastic external surface.

In the application of the rubber layers 11 and 12 to the sheet of stockinette, I find that satisfactory results can be obtained by merely calendering the layers on the stockinette without frictioning them on, but it is to be understood that this invention contemplates frictioning the layers on the fabric or applying them thereto in any other suitable manner.

It is to be noted that instead of cutting blanks from a multi-ply sheet of fabric and rubber, sheets of rubber and stockinette may be cut separately and assembled to form the blanks or otherwise assembled to form the walls of the bottle.

It is also to be noted that it is within the contemplation of the invention to use bias cut fabric for reinforcing the walls, or any other suitable material penetrable by rubber or having sufficient stretch and compressibility to assume the desired forms and permit enlargement of the slit for the purpose of withdrawing the core.

Preferably a reinforcing material is employed which will have or afford interstitial spaces between the strands, of sufficient size to permit the rubber of the layers to penetrate completely through the material and form a homogeneous union between the layers of rubber.

It is furthermore to be noted that in the method described the outer layer of rubber is made considerably thicker than the inner layer for the purpose of giving the outer layer sufficient body and strength to resist frictional wear and to withstand the disintegrating action of constantly circulating currents of air. Thorough tests have shown that rubber surfaces which are in contact with moving currents of air deteriorate much more rapidly than surfaces which are exposed to still air. It is to be understood, however, that this invention is not limited to the use of a thicker outer layer than inner, it being within the contemplation of the invention to make the respective layers of rubber of any desired thickness.

The expression "core of appreciable thickness" as used in this specification and the appended claims, is intended to mean a core of such thickness as to produce a relatively deep body cavity normally capable of holding a considerable quantity of water without the necessity of undesirable distortion of the bottle walls, as distinguished from the thin paper cores heretofore used which produce a shallow cavity incapable of receiving a suitable quantity of water without producing undesirable wall distortion.

While in the embodiment of the invention set forth the use of a core for imparting the desired form to the bottle has been described, it is to be understood that air or other suitable medium may be employed to hold the walls apart to produce the body cavity and to effect in combination with the mold walls the desired penetration of the rubber layers through the fabric.

So far as I am aware it is broadly novel to provide a method for manufacturing water bottles having body walls of rubber reinforced with fabric, whereby the bottle may be vulcanized on a core of appreciable thickness to produce a normally deep body cavity in the finished article.

So far as I am aware it is broadly novel to provide a method for manufacturing water bottles having walls comprising a reinforcing ply of fabric provided on both sides with a layer of rubber, whereby the rubber of the layers will be caused to thoroughly penetrate the interstices of the fabric ply and unite the two layers together in homogeneous union at a great number of closely spaced spots entirely throughout the walls of the bottle.

So far as I am aware it is broadly novel to provide a method of manufacturing a molded water bottle having walls of rubber reinforced with a ply of fabric, whereby the edges of the fabric will be permanently sealed against contact with water and moisture.

As many apparently widely different embodiments of this invention may be made without departing from the spirit thereof, it is to be understood that I do not intend to limit myself to the specific form of the invention as set forth except as indicated in the appended claims.

What I claim and desire to secure by Letters Patent is:

1. That improvement in the art of manufacturing water bottles and the like which consists in placing fabric having an appreciable stretch between layers of rubber and inserting the assembly into a mold for shaping the material into the desired form, and then vulcanizing the assembly under pressure so that the fabric and the layers of rubber become united into one unitary body which cannot split along the original line of contact between the several members.

2. That improvement in the art of manufacturing water bottles and the like, which comprises forming wall material therefor of sheets of rubber with a reinforcement insert of fabric capable of an appreciable stretch disposed therebetween, cutting a pair of companion blanks from the said wall material, applying a strip of vulcanizable rubber to the margin of each of the said blanks, assembling the blanks and joining their margins together in a mold, subjecting the said blanks and their margins to vulcanization under pressure in the mold, causing thereby portions of the softened mass of rubber of the sheets of rubber and their margins to be forced entirely through the interstices of the insert of fabric and to merge together therethrough, and simultaneously causing the rubber of the said strips to unite with the rubber of the joined margins and thus seal the edges of the blanks as well as the edges of the inserts of fabric, whereby the said blanks are formed into an integral, permanent wall structure and the margins securely joined and sealed in a water-tight joint entirely around the water bottle.

3. That improvement in the art of manufacturing water bottles and the like, which comprises forming wall material therefor of sheets of rubber with a reinforcement insert of fabric capable of an appreciable stretch therebetween, cutting a pair of companion blanks from the said wall material, applying to the margin of each of the said blanks a strip of vulcanizable rubber extending outwardly beyond the margin, assembling the blanks on a core in a mold and joining their margins and attached strips together in parallel relation, subjecting the said blanks and their margins to vulcanization and pressure in the mold, causing thereby portions of the softened rubber mass of the sheets of rubber and their margins to be forced completely through the interstices of the insert of fabric and joined in a vulcanized union therethrough, thus binding the insert of fabric securely in the rubber mass, and causing the rubber of the said strips to so enter into a vulcanized union with the rubber of the joined margins as to form a thick covering of rubber completely over the edges of the blanks, whereby the said blanks are formed into an integral, permanent wall structure and their margins into an elastic, water-tight rib around the completed water bottle.

JOHN W. PATTERSON.